US012585178B2

(12) United States Patent
Tanaka

(10) Patent No.: US 12,585,178 B2
(45) Date of Patent: Mar. 24, 2026

(54) LIGHT SOURCE DEVICE AND PROJECTION DISPLAY APPARATUS

(71) Applicant: Panasonic Intellectual Property Management Co., Ltd., Osaka (JP)

(72) Inventor: Takaaki Tanaka, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 394 days.

(21) Appl. No.: 18/138,408

(22) Filed: Apr. 24, 2023

(65) Prior Publication Data

US 2023/0259013 A1     Aug. 17, 2023

Related U.S. Application Data

(63) Continuation of application No. PCT/JP2021/039259, filed on Oct. 25, 2021.

(30) Foreign Application Priority Data

Oct. 28, 2020    (JP) ................................. 2020-180243

(51) Int. Cl.
G03B 21/20         (2006.01)
G03B 21/00         (2006.01)

(52) U.S. Cl.
CPC ....... G03B 21/2013 (2013.01); G03B 21/006 (2013.01); G03B 21/008 (2013.01); (Continued)

(58) Field of Classification Search
CPC .............. G03B 21/2013; G03B 21/006; G03B 21/008; G03B 21/2033; G03B 21/2066; G03B 21/2073; G03B 21/208 (Continued)

(56) References Cited

U.S. PATENT DOCUMENTS

| | | | | | |
|---|---|---|---|---|---|
| 8,870,384 | B2 * | 10/2014 | Imai | ..................... | H04N 9/3167 |
| | | | | | 359/485.06 |
| 2015/0249521 | A1 * | 9/2015 | Ono | ....................... | G02B 27/48 |
| | | | | | 398/65 |

(Continued)

FOREIGN PATENT DOCUMENTS

| | | | | | |
|---|---|---|---|---|---|
| DE | 102012200407 | A1 * | 7/2013 | ........... | G02B 27/283 |
| JP | 2010145431 | A * | 7/2010 | | |

(Continued)

OTHER PUBLICATIONS

Translation of DE_102012200407 (Year: 2025).*

(Continued)

*Primary Examiner* — Jerry L Brooks

(74) *Attorney, Agent, or Firm* — Wenderoth, Lind & Ponack, L.L.P.

(57)                ABSTRACT

A light source device includes a red solid-state light source that emits red light, a green solid-state light source that emits green light, a blue solid-state light source that emits blue light, a second polarizing mirror that combines the red light emitted from the red solid-state light source with the green light emitted from the green solid-state light source, and a beam splitting element that splits the blue light emitted from the blue solid-state light source into transmitted light transmitting the beam splitting element and reflected light reflected on the beam splitting element, and transmits or reflects the combined red light and green light.

10 Claims, 12 Drawing Sheets

<div style="display: flex;">
<div>

(52) U.S. Cl.
   CPC ..... *G03B 21/2033* (2013.01); *G03B 21/2066*
        (2013.01); *G03B 21/2073* (2013.01); *G03B*
                                    *21/208* (2013.01)

(58) Field of Classification Search
   USPC .......................................................... 353/98
   See application file for complete search history.

(56) References Cited

U.S. PATENT DOCUMENTS

| | | | |
|---|---|---|---|
| 2016/0223890 A1 | 8/2016 | Okuda | |
| 2018/0231882 A1* | 8/2018 | Miura | G03B 21/2013 |
| 2019/0064400 A1 | 2/2019 | Tanaka | |
| 2019/0072840 A1* | 3/2019 | Tanaka | G02B 27/141 |
| 2019/0339603 A1 | 11/2019 | Miura | |
| 2019/0394429 A1 | 12/2019 | Tanaka | |
| 2020/0319541 A1 | 10/2020 | Tanaka | |

</div>
<div>

FOREIGN PATENT DOCUMENTS

| | | |
|---|---|---|
| JP | 2012-79622 | 4/2012 |
| JP | 2016-61897 | 4/2016 |
| JP | 2016-145966 | 8/2016 |
| JP | 2019-40177 | 3/2019 |
| JP | 2019-45846 | 3/2019 |
| JP | 2020-3519 | 1/2020 |
| JP | 2020-170064 | 10/2020 |

OTHER PUBLICATIONS

Translation of JP_2010145431_A (Year: 2025).*
International Search Report issued Dec. 21, 2021 in International
(PCT) Application No. PCT/JP2021/039259.

* cited by examiner

</div>
</div>

TRANSMITTANCE %

WAVELENGTH nm

P-POLARIZED

S-POLARIZED

LIGHT SOURCE DEVICE AND PROJECTION DISPLAY APPARATUS

BACKGROUND

1. Technical Field

The present disclosure relates to a projection display apparatus that illuminates an image formed on an image forming element with illumination light and enlarges and projects the image on a screen by a projection lens.

2. Description of the Related Art

Many light source devices using a long-life solid-state light source such as a semiconductor laser or a light emitting diode are disclosed as a light source of a projection display apparatus using a mirror-deflection digital micromirror device (DMD) or an image forming element of a liquid crystal panel. Among the light sources, there is disclosed a light source device having a wide color gamut using solid-state light sources of blue, green, and red (see Unexamined Japanese Patent Publication No. 2019-45846).

SUMMARY

The red, green, and blue laser light sources have different light outputs, efficiencies, and wavelengths, respectively. Accordingly, in the projection display apparatus, the number of required red, green, and blue laser light sources is different in order to obtain desired brightness and white chromaticity. In order to secure high uniformity by eliminating luminance unevenness and color unevenness of a projected image, in the configuration of the light source device of the related art, in a case where light flux sizes of red, green, and blue light beams are different, the light flux sizes of the color light beams are equalized by a light flux splitting element that splits the light flux of the light from the laser light source. A prism array or a mirror array is used as the light flux splitting element, and one color light beam is split and then combined with another color light beam by a dichroic mirror. As a result, a size of the light source device is slightly increased. Thus, even in a case where the light flux sizes are different due to a difference in the number of laser elements of the color light beams, a light source device that has a significantly reduced size while securing high uniformity of a projected image, and a projection display apparatus using the light source device have been desired.

A light source device of the present disclosure includes a red solid-state light source that emits red light, a green solid-state light source that emits green light, a blue solid-state light source that emits blue light, a second polarizing mirror that combines the red light emitted from the red solid-state light source and the green light emitted from the green solid-state light source, and a beam splitting element that splits the blue light emitted from the blue solid-state light source into transmitted light transmitting the beam splitting element and reflected light reflected on the beam splitting element, and transmits or reflects the combined red light and green light.

According to the present disclosure, the light flux sizes of the laser beams of the color light beams are equalized and the plurality of color light beams are combined by the plurality of solid-state light sources of red, green, and blue, the polarizing mirror that combines the color light beams from the solid-state light sources and the beam splitting element that splits the light flux from the solid-state light source of the blue light and combines the plurality of color light beams. Thus, it is possible to form a light source device having a wide color gamut that has a significantly reduced size while eliminating a decrease in uniformity of an image due to the light flux sizes of the color light beams. Thus, it is possible to realize a projection display apparatus having a small size, a wide color gamut, and high luminance.

DETAILED DESCRIPTION

Hereinafter, modes for carrying out the present disclosure will be described with reference to the drawings.

First Exemplary Embodiment

Figure 1:
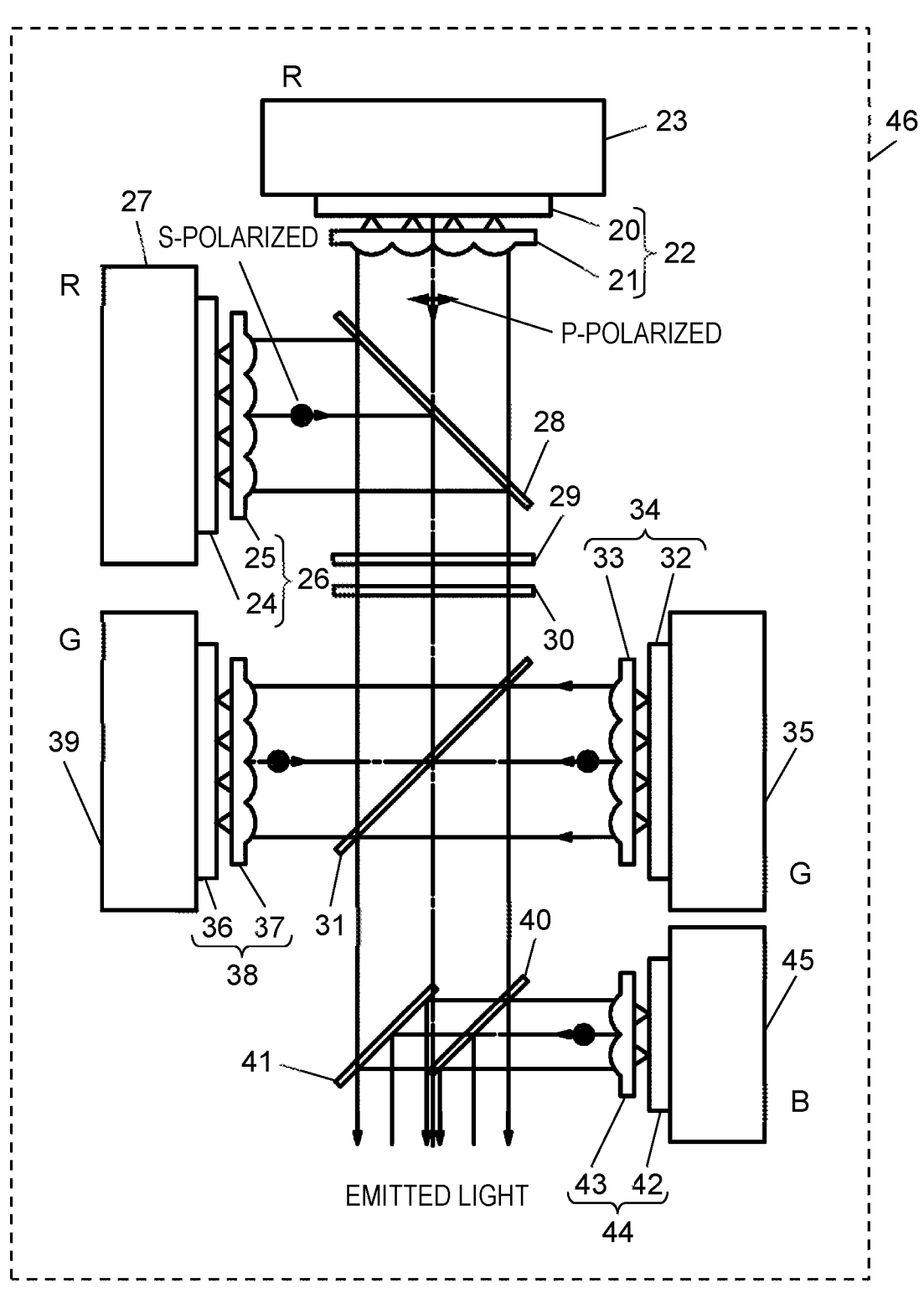
FIG. 1 is a configuration diagram of a light source device according to a first exemplary embodiment of the present disclosure.

FIG. 1 is a configuration diagram of first light source device 46 illustrating a first exemplary embodiment of the present disclosure.

First light source device 46 includes first red laser light source 22 including red semiconductor laser substrate 20 on which a plurality of red semiconductor laser elements are arranged and collimating lens array 21, second red laser light source 26 including red semiconductor laser substrate 24 on which a plurality of red semiconductor laser elements are arranged and collimating lens array 25, first polarizing mirror 28, red transmitting and green reflecting filter 29, quarter wave plate 30 that is a phase difference plate, second polarizing mirror 31, first green laser light source 34 including green semiconductor laser substrate 32 on which a plurality of green semiconductor laser elements are arranged and collimating lens array 33, second green laser light source 38 including green semiconductor laser substrate 36 on which a plurality of green semiconductor laser elements are arranged and collimating lens array 37, blue laser light source 44 including blue semiconductor laser substrate 42 on which a plurality of blue semiconductor laser elements are arranged and collimating lens array 43, beam splitting element 40, blue reflecting dichroic mirror 41, and heat radiation plates 23, 27, 35, 39, 45. FIG. 1 illustrates polarization directions of light beams emitted from the laser light sources.

Red laser light source 22 includes red semiconductor laser substrate 20 on which 24 (6×4) red semiconductor laser elements are two-dimensionally arranged at regular intervals, and collimating lens array 21. Red semiconductor laser substrate 20 emits red light with a wavelength width of 640±8 nm, and emits light that is P-polarized with respect to first polarizing mirror 28. The light beams emitted from red semiconductor laser substrate 20 are condensed and converted into parallel light fluxes by corresponding collimating lens array 21. Heat radiation plate 23 cools red semiconductor laser substrate 20.

Red laser light source 26 includes red semiconductor laser substrate 24 on which 24 (6×4) red semiconductor laser elements are two-dimensionally arranged at regular intervals, and collimating lens array 25. Red semiconductor laser substrate 24 emits red light with a wavelength width of 640±8 nm, and emits light that is S-polarized with respect to first polarizing mirror 28. The light beams emitted from red semiconductor laser substrate 24 are condensed and converted into parallel light fluxes by corresponding collimating lens array 25. Heat radiation plate 27 cools red semiconductor laser substrate 24.

Figure 2:
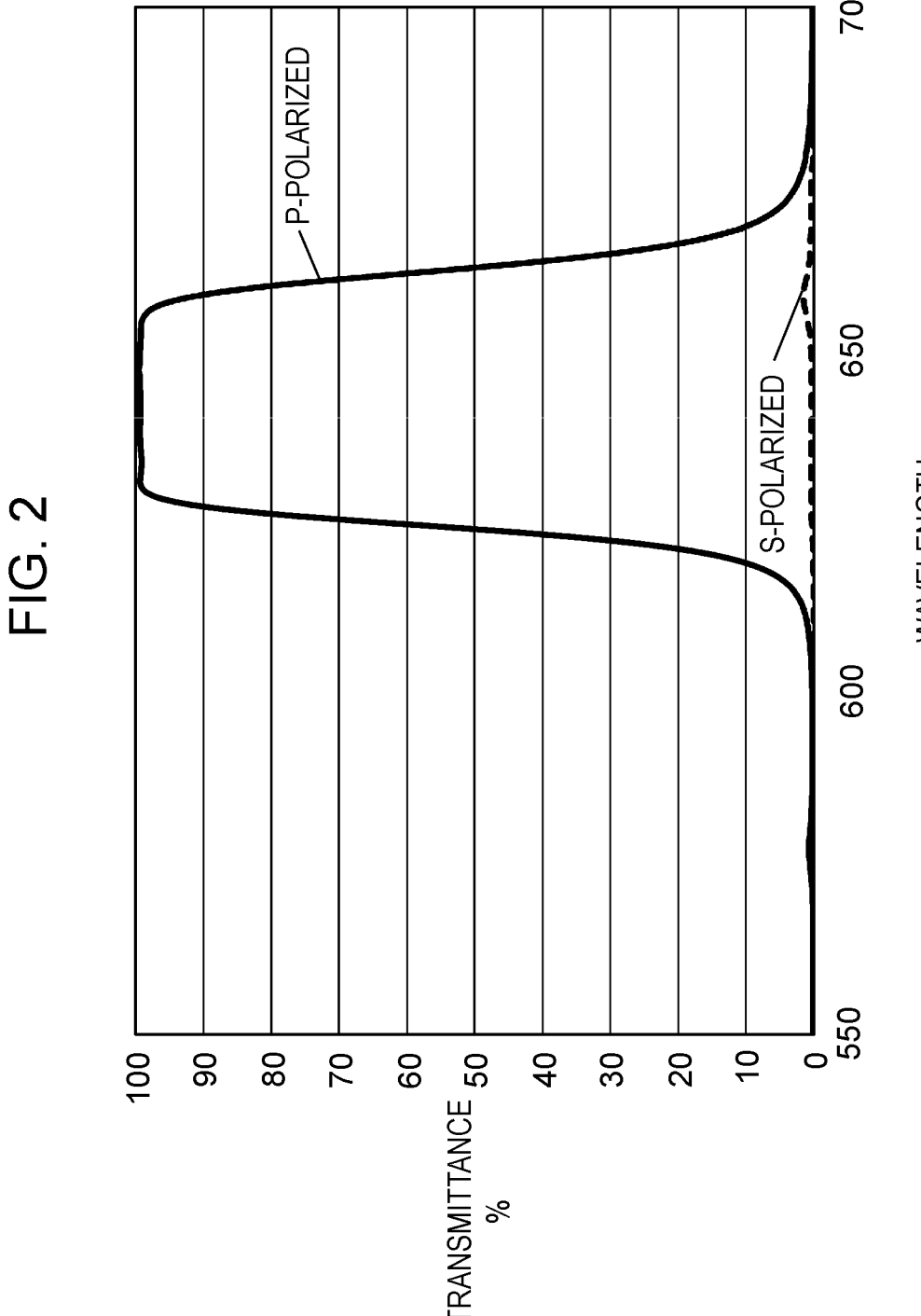
FIG. 2 is a diagram illustrating spectral characteristics of a first polarizing mirror according to the first exemplary embodiment.

The laser beams from red laser light sources 22, 26 are incident, as P-polarized light and S-polarized light, on first polarizing mirror 28, respectively. First polarizing mirror 28 is arranged such that an incidence angle is 45 degrees. First polarizing mirror 28 transmits 95% or more of P-polarized red laser beams, and reflects 95% or more of S-polarized red laser beams. First polarizing mirror 28 has, for example, spectral characteristics illustrated in FIG. 2. The combined light beams from the plurality of red laser light sources 22, 26 are transmitted through red transmitting and green reflecting filter 29, and then incident on quarter wave plate 30.

Green laser light source 34 includes green semiconductor laser substrate 32 on which 24 (6×4) green semiconductor laser elements are two-dimensionally arranged at regular intervals, and collimating lens array 33. Green semiconductor laser substrate 32 emits green light with a wavelength width of 525±8 nm, and emits light that is S-polarized with respect to second polarizing mirror 31. The light beams emitted from green semiconductor laser substrate 32 are individually condensed and converted into parallel light beams by corresponding collimating lens array 33. Heat radiation plate 35 cools green semiconductor laser substrate 32.

Green laser light source 38 includes green semiconductor laser substrate 36 on which 24 (6×4) green semiconductor laser elements are two-dimensionally arranged at regular intervals, and collimating lens array 37. Green semiconductor laser substrate 36 emits green light with a wavelength width of 525±8 nm, and emits light that is S-polarized with respect to second polarizing mirror 31. The light beams emitted from green semiconductor laser substrate 36 are individually condensed and converted into parallel light beams by corresponding collimating lens array 37. Heat radiation plate 39 cools green semiconductor laser substrate 36.

The laser beams from green laser light sources 34, 38 are incident, as S-polarized light, on second polarizing mirror 31. Second polarizing mirror 31 is arranged such that an incidence angle is 45 degrees.

Figure 3:
FIG. 3 is a diagram illustrating spectral characteristics of a second polarizing mirror according to the first exemplary embodiment.

FIG. 3 illustrates spectral characteristics of second polarizing mirror 31. The spectral characteristics indicate spectral transmission factors of P-polarized light and S-polarized light at an incidence angle of 45 degrees. The spectral characteristics are an example designed such that high refractive index materials such as TiO2 and low refractive index materials such as SiO2 are alternately laminated to form 72 optical thin films on a glass substrate of the second polarizing mirror. Second polarizing mirror 31 has a characteristic of functioning as a polarization beam splitter for green laser beam and functioning as a red transmitting dichroic mirror for red laser beam. Second polarizing mirror 31 transmits 95% or more of P-polarized green laser beams and P-polarized and S-polarized red laser beams, and reflects 95% or more of S-polarized green laser beams.

The S-polarized light beam from green laser light source 38 is reflected by second polarizing mirror 31 and then incident on quarter wave plate 30. Quarter wave plate 30 is a phase difference plate having a phase difference of a quarter wavelength near a wavelength of an emission center of green laser light source 38. Quarter wave plate 30 is arranged with an optical axis of 45 degrees when a P-polarization direction in the drawing is defined as 0 degrees. Quarter wave plate 30 is a thin film phase difference plate utilizing birefringence by oblique vapor deposition of a dielectric material. The thin film phase difference plate is made of an inorganic material, and is excellent in durability and reliability similar to inorganic optical crystals such as quartz. The green laser beams transmitted through quarter wave plate 30 and converted into circularly polarized light are incident on red transmitting and green reflecting filter 29 that has a reflective film such as a multilayer dielectric film, transmits the red laser beam, and reflects the green laser beam. The green laser beam reflected by red transmitting and green reflecting filter 29 is inverted in phase to be reversely circularly polarized light, transmitted through quarter wave plate 30, and converted into P-polarized light. The P-polarized light whose polarization direction has been converted by quarter wave plate 30 is incident on second polarizing mirror 31 and transmits therethrough again toward beam splitting element 40 and dichroic mirror 41

In addition, the S-polarized light from green laser light source 34 is reflected by second polarizing mirror 31. In this manner, light beams from the plurality of green laser light sources 34, 38 are combined. The P-polarized and S-polarized red light beams from the plurality of red laser light sources 22, 26 are changed in phase by quarter wave plate 30 to be elliptically polarized light, and transmitted. Thereafter, 95% or more of red light beams are transmitted through second polarizing mirror 31. In this manner, the light beams from the plurality of red laser light sources and the light beams from the plurality of green laser light sources are combined through the second polarizing mirror 31.

Blue laser light source 44 includes blue semiconductor laser substrate 42 on which 12 (6×2) blue semiconductor laser elements are two-dimensionally arranged at regular intervals, and collimating lens array 43. Blue semiconductor laser substrate 42 emits blue light with a wavelength width of 465±8 nm, and emits light that is S-polarized with respect to beam splitting element 40. Since the blue semiconductor laser has higher luminous efficiency and smaller light output required for desired white light chromaticity than the red and green semiconductor lasers, the number of blue semiconductor lasers is about one-fourth the number of red or green semiconductor lasers. The light beams emitted from blue semiconductor laser substrate 42 are individually condensed and converted into parallel light beams by corresponding collimating lens array 43. Heat radiation plate 45 cools blue semiconductor laser substrate 42. Light beams from blue laser light source 44 are incident on beam splitting element 40. Beam splitting element 40 is arranged such that an incidence angle is 45 degrees.

Figure 4:
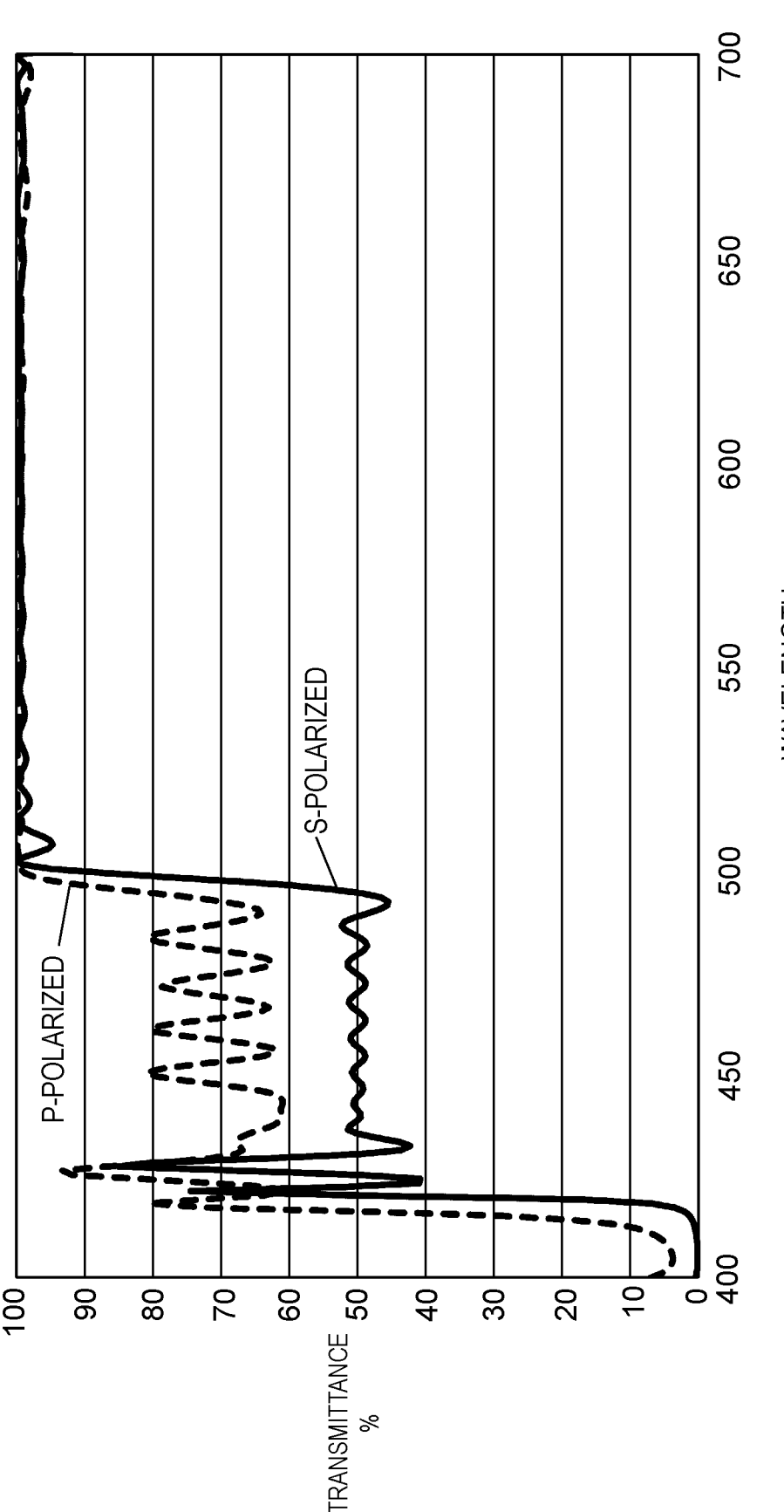
FIG. 4 is a diagram illustrating spectral characteristics of a beam splitting element according to the first exemplary embodiment.
Figure 5:
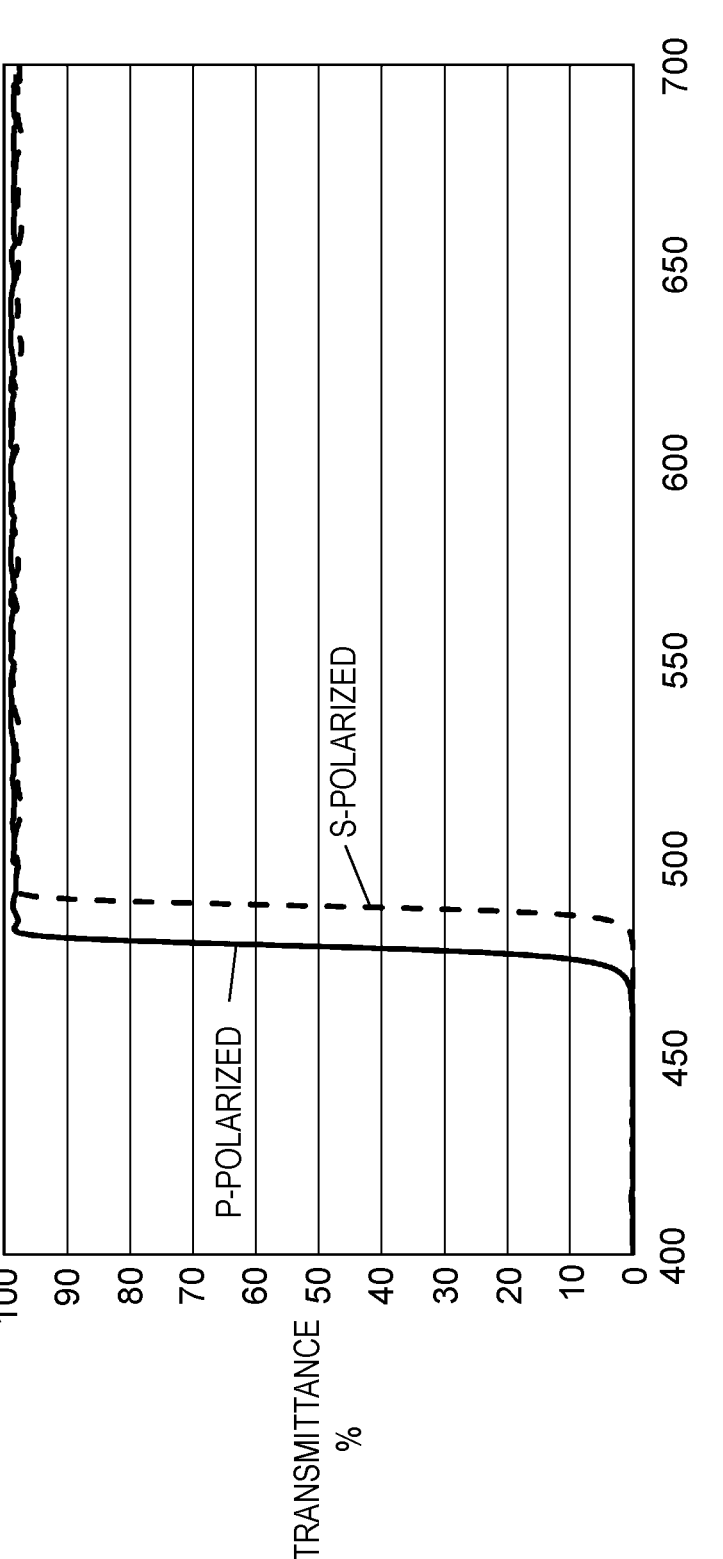
FIG. 5 is a diagram illustrating spectral characteristics of a blue reflecting dichroic mirror according to the first exemplary embodiment.

FIG. 4 illustrates spectral characteristics of beam splitting element 40. The spectral characteristics indicate spectral transmission factors of P-polarized light and S-polarized light at an incidence angle of 45 degrees. The spectral characteristics are an example designed such that high refractive index materials such as TiO2 and low refractive index materials such as SiO2 are alternately laminated to form 57 optical thin films on a glass substrate of the beam splitting element. Beam splitting element 40 splits the S-polarized blue light into transmitted light and reflected light at approximately 50%, and transmits 90% or more of P-polarized and S-polarized green light beams and red light including tolerance. Characteristics of transmitting and reflecting blue light at approximately 50% are characteristics of transmitting and reflecting blue light at 40% to 60% and 60% to 40% including tolerances. The blue light beams transmitted through beam splitting element 40 are incident on blue reflecting dichroic mirror 41. Blue reflecting dichroic mirror 41 is arranged such that an incidence angle is 45 degrees. Blue reflecting dichroic mirror 41 reflects 95% or more of blue light beams in a first direction, and transmits 95% or more of green light beams and red light beams. Blue reflecting dichroic mirror 41 has, for example, spectral characteristics illustrated in FIG. 5. Beam splitting element 40 and blue reflecting dichroic mirror 41 substantially equalize light flux sizes of the light beams from the red and green laser light sources and light flux sizes of the light beams from the blue laser light source to combine the light beams with high efficiency. In this manner, the light beams from the blue, green, and red laser light sources are combined in a small-size and highly efficient manner to emit white light.

Although the thin film phase difference plate has been described as quarter wave plate 30, a microstructural phase difference plate utilizing birefringence generated in a periodic microstructure smaller than the wavelength of light may be used.

Although the green laser light source, the red laser light source, and the blue laser light source have configurations in which 48, 48, and 12 semiconductor laser elements are arranged, respectively, these light sources may be formed by using more semiconductor laser elements for increasing luminance.

In first light source device 46, red laser light sources 22, 26 and green laser light sources 34, 38 are arranged as illustrated in FIG. 1. However, characteristics of the first and second polarizing mirrors, the filter, the phase difference plate, and the like may be changed, the green laser light source may be arranged at the positions of red laser light sources 22, 26, and the red laser light source may be arranged at the positions of green laser light sources 34, 38, and the arrangement of the red laser light source and the green laser light source may be switched.

In first light source device 46, as illustrated in FIG. 1, the P-polarized red light from red laser light source 22 and the S-polarized red light from red laser light source 26 are combined by first polarizing mirror 28. However, as long as a sufficient amount of red light can be secured, the red light may be directly incident on filter 29 for red transmitting and green reflecting without combining the red light by first polarizing mirror 28 by using polarized light. The same applies to a case where the arrangement of the red laser light source and the green laser light source is switched.

As described above, the light source device of the present disclosure includes the blue, green, and red laser light sources, the polarizing mirror, the phase difference plate, the filter, and the beam splitting element, and thus, the beam flux sizes of the laser beams of the color light beams are equalized. Thus, it is possible to form a small-size and highly efficient light source device while securing high uniformity in which luminance unevenness and color unevenness of an image are eliminated.

Second Exemplary Embodiment

Figure 6:
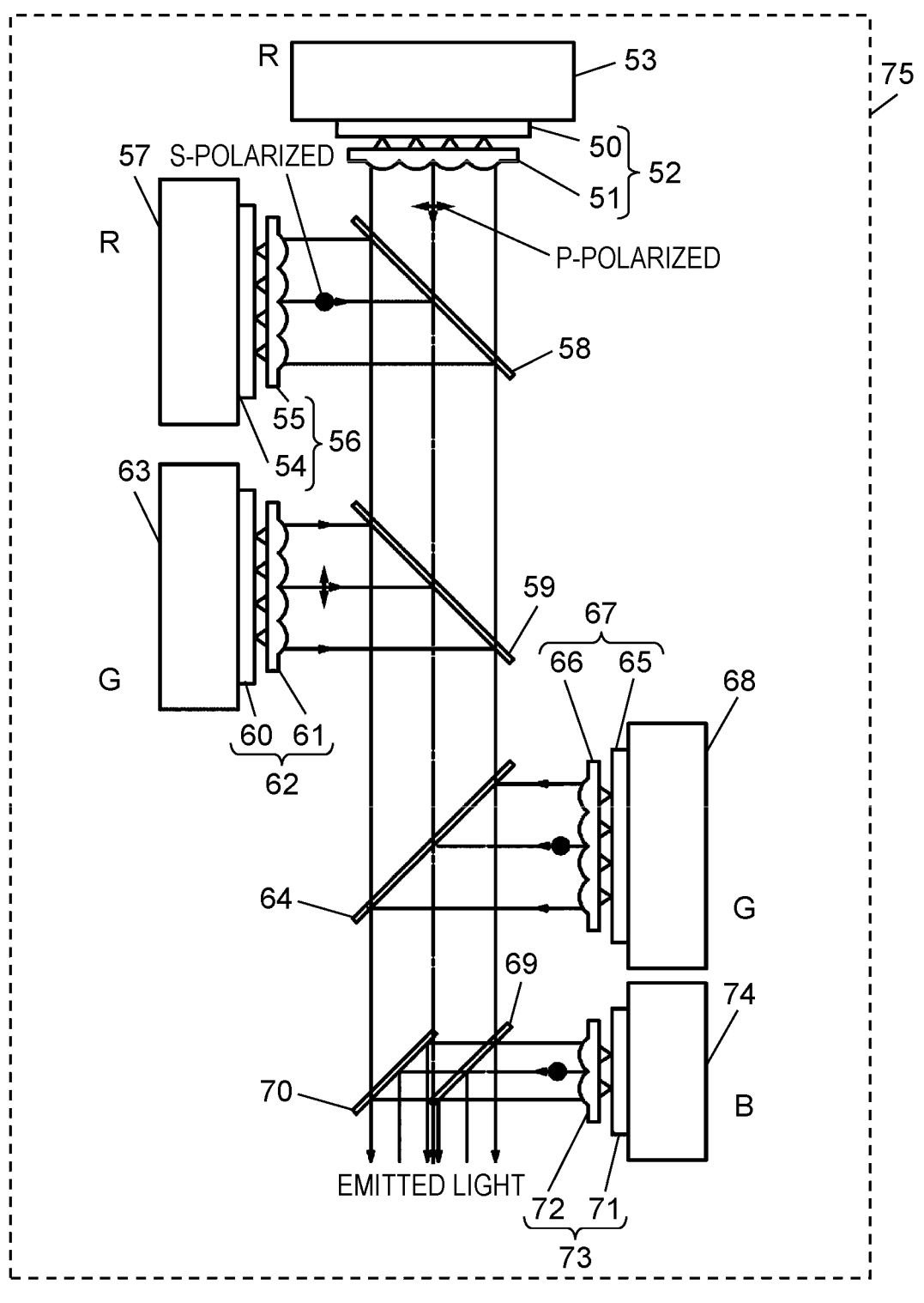
FIG. 6 is a configuration diagram of a light source device according to a second exemplary embodiment of the present disclosure.

FIG. 6 is a configuration diagram of second light source device 75 illustrating a second exemplary embodiment of the present disclosure.

Second light source device 75 includes red laser light source 52 including red semiconductor laser substrate 50 on which a plurality of red semiconductor laser elements are arranged and collimating lens array 51, red laser light source 56 including red semiconductor laser substrate 54 on which a plurality of red semiconductor laser elements are arranged and collimating lens array 55, first polarizing mirror 58, green reflecting dichroic mirror 59, second polarizing mirror 64, green laser light source 62 including green semiconductor laser substrate 60 on which a plurality of green semiconductor laser elements are arranged and collimating lens array 61, green laser light source 67 including green semiconductor laser substrate 65 on which a plurality of green semiconductor laser elements are arranged and collimating lens array 66, blue laser light source 73 including blue semiconductor laser substrate 71 on which a plurality of blue semiconductor laser elements are arranged and collimating lens array 72, beam splitting element 69, blue reflecting dichroic mirror 70, heat radiation plates 53, 57, 63, 68, 74. FIG. 6 illustrates polarization directions of light beams emitted from the laser light sources. Differences from first light source device 46 in FIG. 1 are characteristics of the second polarizing mirror, and that a green reflecting dichroic mirror is provided without including a filter or a phase difference plate.

Red laser light source 52 includes red semiconductor laser substrate 50 on which 24 (6×4) red semiconductor laser elements are two-dimensionally arranged at regular intervals; and collimating lens array 51. Red semiconductor laser substrate 50 emits red light with a wavelength width of 640±8 nm, and emits light that is P-polarized with respect to first polarizing mirror 58. The light beams emitted from red semiconductor laser substrate 50 are condensed and converted into parallel light fluxes by corresponding collimating lens array 51. Heat radiation plate 53 cools red semiconductor laser substrate 50.

Red laser light source 56 includes red semiconductor laser substrate 54 on which 24 (6×4) red semiconductor laser elements are two-dimensionally arranged at regular intervals; and collimating lens array 55. Red semiconductor laser substrate 54 emits red light with a wavelength width of 640±8 nm, and emits light that is S-polarized with respect to first polarizing mirror 58. The light emitted from red semiconductor laser substrate 54 are condensed and converted into parallel light fluxes by corresponding collimating lens array 55. Heat radiation plate 57 cools red semiconductor laser substrate 54.

The laser beams from red laser light sources 52, 56 are incident, as the P-polarized light and the S-polarized light, on first polarizing mirror 58. First polarizing mirror 58 is arranged such that an incidence angle is 45 degrees. First polarizing mirror 58 transmits 95% or more of P-polarized red laser beams, and reflects 95% or more of S-polarized red laser beams. First polarizing mirror 58 has, for example, spectral characteristics similar to first polarizing mirror 28 illustrated in FIG. 2. The light beams from the plurality of red laser light sources are combined by first polarizing mirror 58, and then incident on green reflecting dichroic mirror 59.

Figure 7:
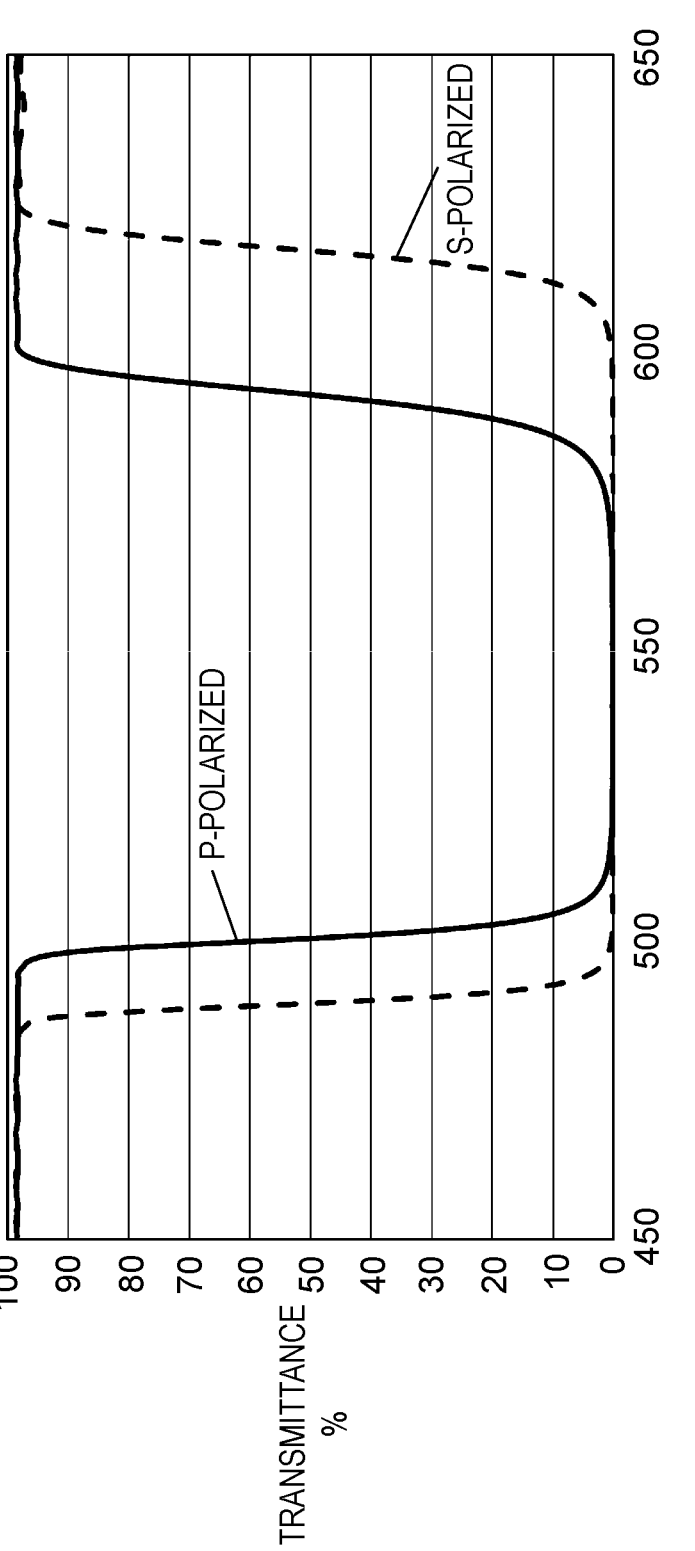
FIG. 7 is a diagram illustrating spectral characteristics of a green reflecting dichroic mirror according to the second exemplary embodiment.

Green laser light source 62 includes green semiconductor laser substrate 60 on which 24 (6×4) green semiconductor laser elements are two-dimensionally arranged at regular intervals; and collimating lens array 61. Green semiconductor laser substrate 60 emits green light with a wavelength width of 525±8 nm, and emits light that is P-polarized with respect to green reflecting dichroic mirror 59. The light beams emitted from green semiconductor laser substrate 60 are individually condensed and converted into parallel light beams by corresponding collimating lens array 61. Heat radiation plate 63 cools green semiconductor laser substrate 60. Green reflecting dichroic mirror 59 is arranged such that an incidence angle is 45 degrees. Green reflecting dichroic mirror 59 reflects 95% or more of P-polarized green laser light beams, and transmits 95% or more of P-polarized and S-polarized red laser light beams. Green reflecting dichroic mirror 59 has, for example, spectral characteristics illustrated in FIG. 7. The light beams from red laser light sources 52, 56 and the light beams from green laser light source 62 are combined by green reflecting dichroic mirror 59, and then incident on second polarizing mirror 64.

Green laser light source 67 includes green semiconductor laser substrate 65 on which 24 (6×4) green semiconductor laser elements are two-dimensionally arranged at regular intervals; and collimating lens array 66. Green semiconductor laser substrate 65 emits green light with a wavelength width of 525±8 nm, and emits light that is S-polarized with respect to second polarizing mirror 64. The light beams emitted from green semiconductor laser substrate 65 are individually condensed and converted into parallel light beams by corresponding collimating lens array 66. Heat radiation plate 68 cools green semiconductor laser substrate 65.

The laser beams from green laser light source 67 are incident, as the S-polarized light, on second polarizing mirror 64. Second polarizing mirror 64 is arranged such that an incidence angle is 45 degrees. Second polarizing mirror 64 has a characteristic of functioning as a polarization beam splitter for green laser beam and functioning as a red transmitting dichroic mirror for red laser beam. Second polarizing mirror 64 transmits 95% or more of P-polarized green laser beams and P-polarized and S-polarized red laser beams, and reflects 95% or more of S-polarized green laser beams. Second polarizing mirror 64 has, for example, spectral characteristics similar to second polarizing mirror 31 illustrated in FIG. 3.

The light beams from red laser light sources 52, 56 and the light beams from green laser light source 62 are transmitted through second polarizing mirror 64 with a transmittance of 95% or more. The light from green laser light source 67 is reflected by second polarizing mirror 64 with a reflectance of 95% or more. In this manner, the light beams from the plurality of red laser light sources and the light beams from the plurality of green laser light sources are combined.

Blue laser light source 73 includes blue semiconductor laser substrate 71 on which 12 (6×2) blue semiconductor laser elements are two-dimensionally arranged at regular intervals; and collimating lens array 72. Blue semiconductor laser substrate 71 emits blue light with a wavelength width of 465±8 nm, and emits light that is S-polarized with respect to beam splitting element 69. Since the blue semiconductor laser has higher luminous efficiency and smaller light output required for desired white light chromaticity than the red and green semiconductor lasers, the number of blue semiconductor lasers is about one-fourth the number of red or green semiconductor lasers. The light beams emitted from blue semiconductor laser substrate 71 are individually condensed and converted into parallel light beams by corresponding collimating lens array 72. Heat radiation plate 74 cools blue semiconductor laser substrate 71. Light beams from blue laser light source 73 are incident on beam splitting element 69. Beam splitting element 69 is arranged such that an incidence angle is 45 degrees.

Beam splitting element 69 has, for example, spectral characteristics similar to beam splitting element 40 illustrated in FIG. 4. The blue light beams transmitted through beam splitting element 69 are incident on blue reflecting dichroic mirror 70. Blue reflecting dichroic mirror 70 is arranged such that an incidence angle is 45 degrees. Blue reflecting dichroic mirror 70 reflects 95% or more of blue light beams, and transmits 95% or more of green light beams and red light beams. Blue reflecting dichroic mirror 70 has, for example, spectral characteristics similar to blue reflecting dichroic mirror 41 illustrated in FIG. 5. Beam splitting element 69 and blue reflecting dichroic mirror 70 substantially equalize the light flux sizes of the light beams from the red and green laser light sources and the light flux sizes of the light beams from the blue laser light source to combine the light beams with high efficiency. In this manner, the light beams from the blue, green, and red laser light sources are combined in a small-size and highly efficient manner to emit white light.

Since the quarter wave plate is not arranged and the green reflecting dichroic mirror is arranged, the size of first light source device 46 illustrated in FIG. 1 is slightly increased. However, since an expensive quarter wave plate is not arranged, an inexpensive light source device can be formed.

Although the green laser light source, the red laser light source, and the blue laser light source have configurations in which 48, 48, 12 semiconductor laser elements are arranged, respectively, these light sources may be formed by using more semiconductor laser elements for increasing luminance.

In second light source device 75, as illustrated in FIG. 6, red laser light sources 52, 56 and green laser light sources 62, 67 are arranged. However, characteristics of the first and second polarizing mirrors, the green reflecting dichroic mirror, and the like may be changed, and the green laser light source may be arranged at the positions of red laser light sources 52, 56, and the red laser light source may be arranged at the positions of the green laser light sources 62, 67.

In second light source device 75, as illustrated in FIG. 6, the P-polarized red light from red laser light source 52 and the S-polarized red light from red laser light source 56 are combined by first polarizing mirror 58. However, as long as a sufficient amount of red light can be secured, the red light may be directly incident on second polarizing mirror 64 without combining the red light by first polarizing mirror 58 by using polarized light. The same applies to a case where the arrangement of the red laser light source and the green laser light source is switched. As described above, the light source device of the present disclosure includes the blue, green, and red laser light sources, the polarizing mirror, the dichroic mirror, and the beam splitting element, and thus, the light flux sizes of the laser beams of the color light beams are equalized. Thus, it is possible to form a small and highly efficient light source device while securing high uniformity.

Third Exemplary Embodiment

Figure 8:
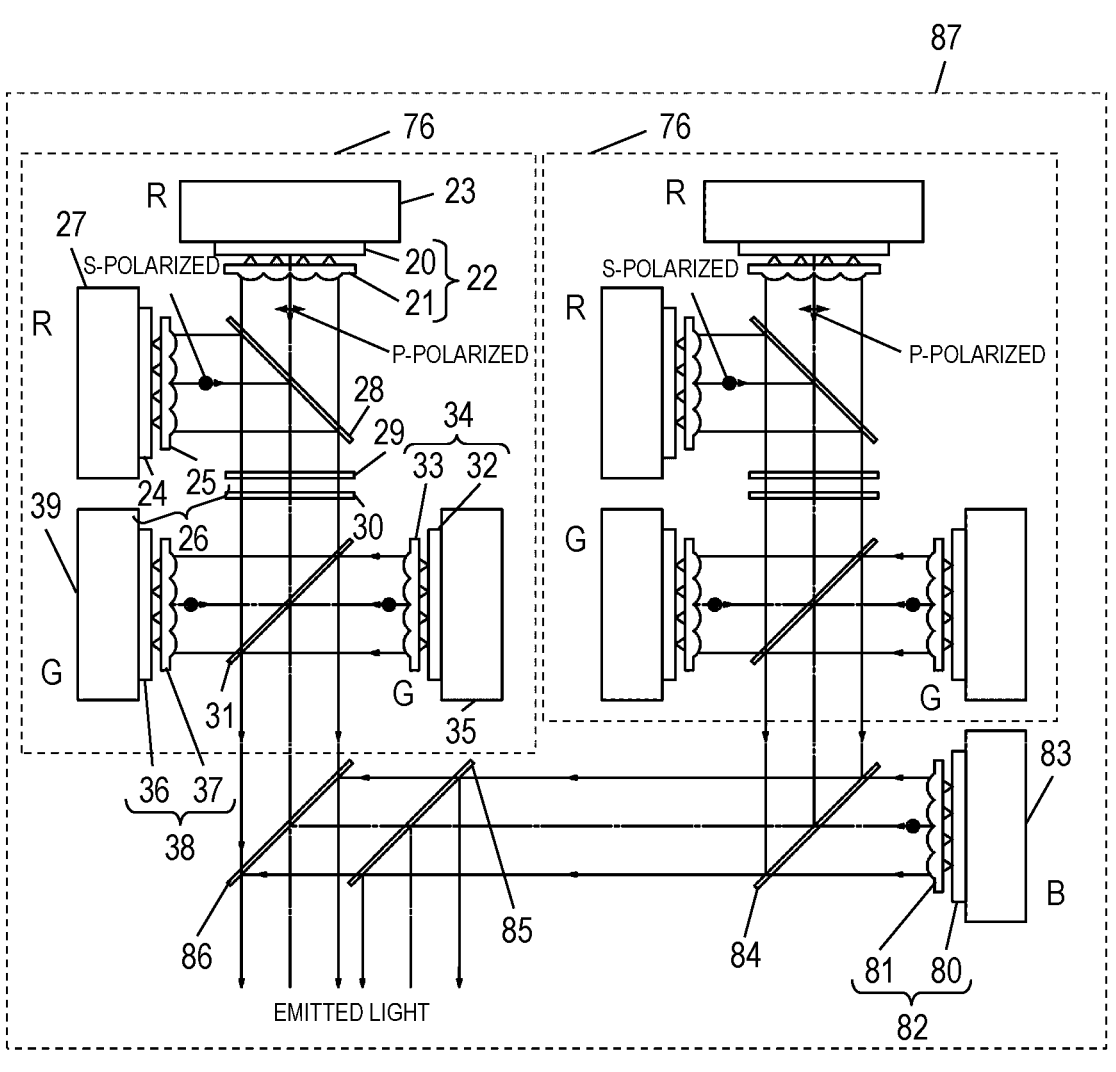
FIG. 8 is a configuration diagram of a light source device according to a third exemplary embodiment of the present disclosure.

FIG. 8 is a configuration diagram of third light source device 87 illustrating a third exemplary embodiment of the present disclosure.

Third light source device 87 includes light source optical systems 76 each including red laser light sources 22, 26, green laser light sources 34, 38, and an optical system that combines red laser light and green laser light, blue laser light source 82 including blue semiconductor laser substrate 80 on which a plurality of blue semiconductor laser elements are arranged and collimating lens array 81, blue transmitting dichroic mirror 84, beam splitting element 85, blue reflecting dichroic mirror 86, and heat radiation plate 83.

Specifically, light source optical system 76 includes a plurality of red laser light sources 22, 26, a plurality of green laser light sources 34, 38, heat radiation plates 23, 27, 35, 39 of the laser light sources, first polarizing mirror 28, red transmitting and green reflecting filter 29, quarter wave plate 30, and second polarizing mirror 31, and a configuration of the optical system that combines the red laser light with the green laser light is similar to the configuration of first light source device 46 illustrated in FIG. 1. In addition, in order to increase the luminance, a plurality of optical systems that combine the light beams from the red and green laser light sources with the light beams from the red and green laser light sources are used. In the present exemplary embodiment, two light source optical systems 76 are provided. FIG. 8 illustrates polarization directions of light beams emitted from the laser light sources.

Figure 9:
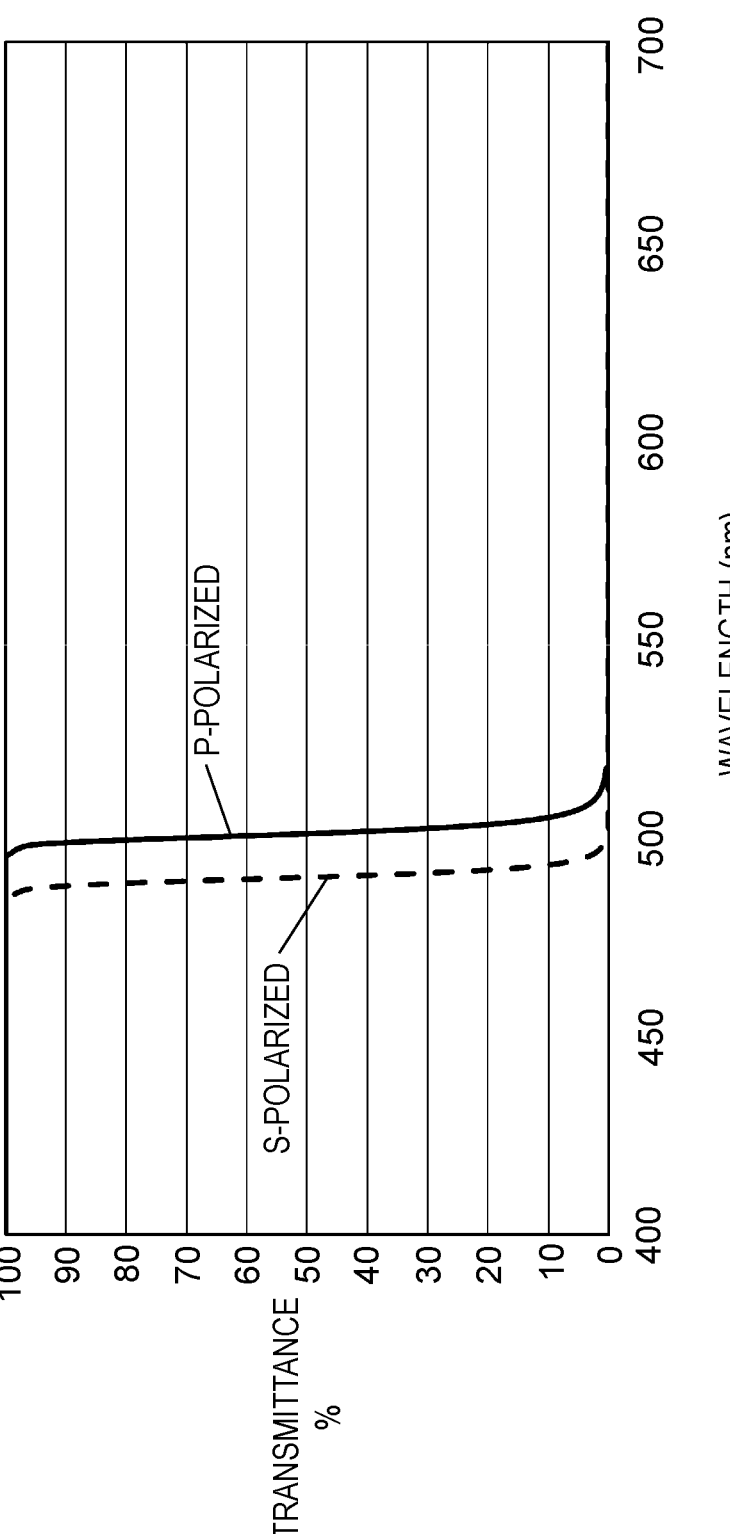
FIG. 9 is a diagram illustrating spectral characteristics of a blue transmitting dichroic mirror according to the third exemplary embodiment.

The red laser beams and the green laser beams incident on blue transmitting dichroic mirror 84 are reflected by blue transmitting dichroic mirror 84 and then incident on beam splitting element 85. Blue transmitting dichroic mirror 84 is arranged such that an incidence angle is 45 degrees. Blue transmitting dichroic mirror 84 reflects 95% or more of red light beams and green light beams and transmits 95% or more of blue light beams. Blue transmitting dichroic mirror 84 has, for example, spectral characteristics illustrated in FIG. 9.

The red laser light beams and the green laser light beams incident on blue reflecting dichroic mirror 86 are transmitted through blue reflecting dichroic mirror 86. Blue reflecting dichroic mirror 86 is arranged such that an incidence angle is 45 degrees. Blue reflecting dichroic mirror 86 transmits 95% or more of red light beams and green light beams and reflects 95% or more of blue light beams. Blue reflecting dichroic mirror 86 has, for example, spectral characteristics similar to blue reflecting dichroic mirror 41 illustrated in FIG. 5.

Blue laser light source 82 includes blue semiconductor laser substrate 80 on which 24 (6×4) blue semiconductor laser elements are two-dimensionally arranged at regular intervals, and collimating lens array 81. Blue semiconductor laser substrate 80 emits blue light with a wavelength width of 465±8 nm, and emits light that is S-polarized with respect to beam splitting element 85. Since the blue semiconductor laser has higher luminous efficiency and smaller light output required for desired white light chromaticity than the red and green semiconductor lasers, the number of blue semiconductor lasers is about one-fourth the number of red or green semiconductor lasers. The light beams emitted from blue semiconductor laser substrate 80 are individually condensed and converted into parallel light beams by corresponding collimating lens array 81. Heat radiation plate 83 cools blue semiconductor laser substrate 80. The light beams from blue laser light source 82 are transmitted through blue transmitting dichroic mirror 84 and incident on beam splitting element 85.

Figure 10:
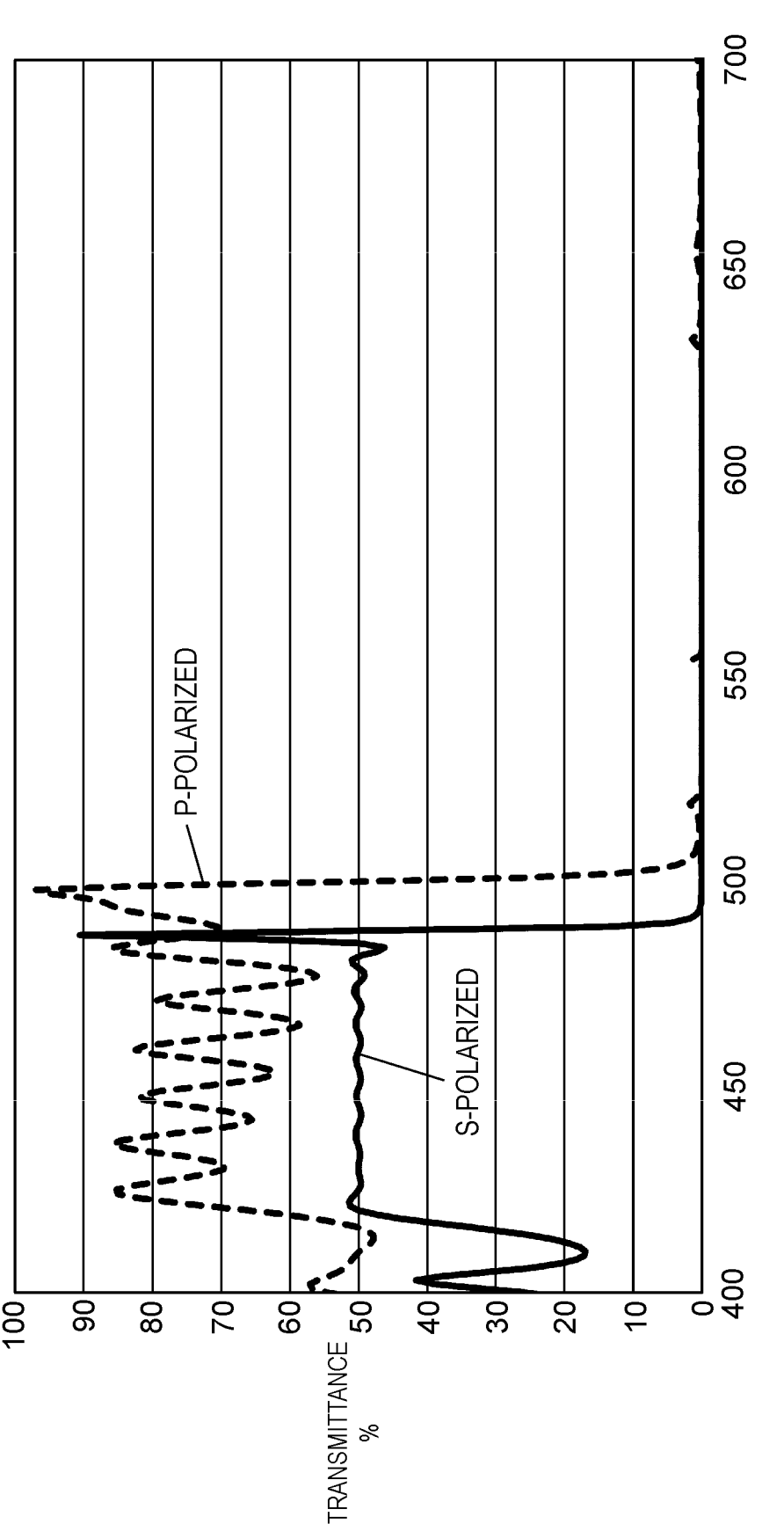
FIG. 10 is a diagram illustrating spectral characteristics of a beam splitting element according to the third exemplary embodiment.

FIG. 10 illustrates spectral characteristics of beam splitting element 85. The spectral characteristics indicate spectral transmission factors of P-polarized light and S-polarized light at an incidence angle of 45 degrees. The spectral characteristics are an example designed such that high refractive index materials such as TiO2 and low refractive index materials such as SiO2 are alternately laminated to form 59 optical thin films on a glass substrate of the beam splitting element. Beam splitting element 85 splits the S-polarized blue light into transmitted light and reflected light at approximately 50%, and reflects 90% or more of P-polarized and S-polarized green light beams and red light beams including tolerance. Characteristics of transmitting and reflecting blue light at approximately 50% are characteristics of transmitting and reflecting blue light at 40% to 60% and 60% to 40% including tolerances. Beam splitting element 85 reflects approximately 50% of blue light beams, and green light beams and red light beams reflected by blue transmitting dichroic mirror 84. Approximately 50% of blue light beams transmitted through beam splitting element 85 are reflected by blue reflecting dichroic mirror 86, and are combined with the green light beams and the red light beams transmitted through blue reflecting dichroic mirror 86.

Beam splitting element 85 and blue reflecting dichroic mirror 86 substantially equalize the light flux sizes of the light beams from the red and green laser light sources and the light flux sizes of the light beams from the blue laser light source to combine the light beams with high efficiency. In this manner, the blue, green, and red laser beams are combined in a small-size and highly efficient manner to emit white light.

As compared with first light source device 46 illustrated in FIG. 1, since a larger number of laser elements are used than the number of laser elements of the red, green, and blue laser light sources, luminance can be increased. In addition, since a plurality of optical systems that combine the red laser light source with the green laser light are used, the luminance can be increased while the cost is reduced.

As described above, the light source device of the present disclosure includes the blue, green, and red laser light sources, the polarizing mirror, the phase difference plate, the filter, and the beam splitting element, and thus, the beam flux sizes of the laser beams of the color light beams are equalized. Thus, it is possible to form a small and highly efficient light source device while securing high uniformity.

Fourth Exemplary Embodiment

Figure 11:
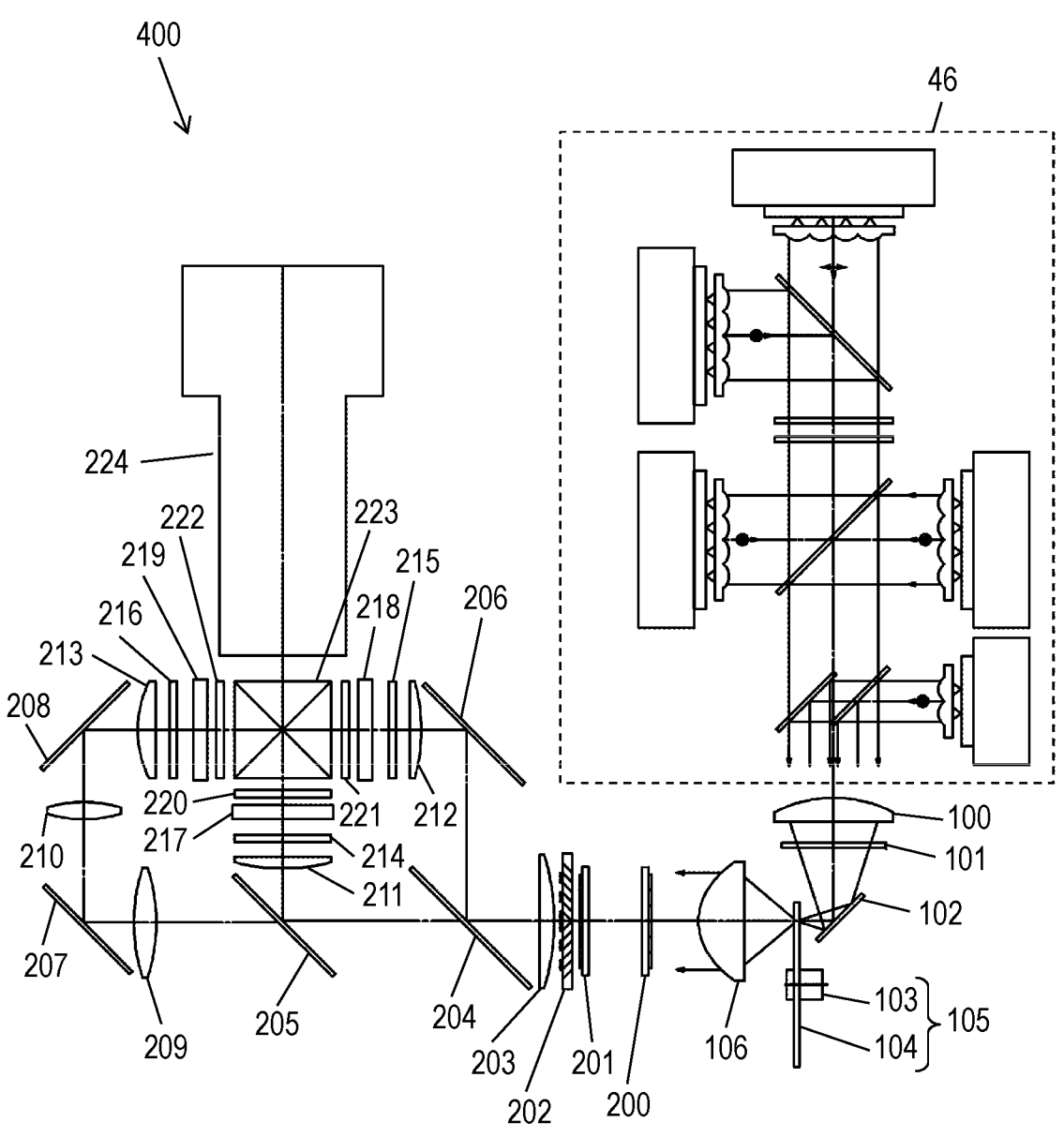
FIG. 11 is a configuration diagram of a projection display apparatus according to a fourth exemplary embodiment of the present disclosure.

FIG. 11 illustrates first projection display 400 illustrating a fourth exemplary embodiment of the present disclosure. As an image former, an active matrix-type transmissive liquid crystal panel of a TN mode or VA mode in which a thin film transistor is formed in a pixel region is used. First light source device 46 of the first exemplary embodiment is used as the light source device.

In addition to first light source device 46, the first projection display apparatus further includes condenser lenses 100, 106, diffuser plate 101, reflection mirror 102, rotary diffuser plate 105 that is a dynamic diffuser plate, first lens array plate 200, second lens array plate 201, polarization conversion element 202, superposition lens 203, blue reflecting dichroic mirror 204, green reflecting dichroic mirror 205, reflection mirrors 206, 207, 208, relay lenses 209, 210, field lenses 211, 212, 213, incidence-side polarizing plates 214, 215, 216, liquid crystal panels 217, 218, 219, emission-side polarizing plates 220, 221, 222, color-combining prism 223 including a red reflecting dichroic mirror and a blue reflecting dichroic mirror, and projection lens 224.

Blue, green, and red laser beams emitted from first light source device 46 are transmitted through condenser lens 100, diffuser plate 101, are reflected by reflection mirror 102, and then condensed on rotary diffuser plate 105. Diffuser plate 101 has a diffusion surface having fine microlenses formed in an array on a glass substrate, and diffuses incident light. A diffusion angle that is a half-value angle width which corresponds to 50% of a maximum intensity of diffusion light is approximately 2 degrees, and a degree of diffusion is reduced in order to suppress a loss due to diffusion. Rotary diffuser plate 105 includes circular diffuser plate 104 in which a diffusion layer having micro irregularities is formed on one surface of a glass substrate, and motor 103 in a central portion, and the rotation of the rotary diffuser plate is controllable. A diffusion angle of rotary diffuser plate 105 is approximately 10 degrees. A random interference pattern on a screen caused by the laser beam varies temporally and spatially at a high speed by rotary diffuser plate 105, by which speckle noise can be eliminated. In addition, small luminance unevenness caused by a small emission size and the number of emissions of the laser light sources can be eliminated in cooperation with diffuser plate 101. Light diffused by rotary diffuser plate 105 is condensed by condenser lens 106 and converted into substantially parallel light. The substantially parallel light is incident on first lens array plate 200 including a plurality of lens elements.

The light flux incident on first lens array plate 200 is split into a large number of light fluxes. The multiple split light fluxes converge on second lens array plate 201 including a plurality of lenses. The lens elements of first lens array plate 200 have an aperture shape similar to the aperture shape of liquid crystal panels 217, 218, 219. The lens elements of second lens array plate 201 have focal lengths determined such that first lens array plate 200 and liquid crystal panels 217, 218, 219 have a substantially conjugate relationship. The split light from second lens array plate 201 enters polarization conversion element 202. Polarization conversion element 202 includes a polarization separation prism and a half wave plate. Polarization conversion element 202 converts the incident P-polarized light into S-polarized light, and emits the incident S-polarized light as S-polarized light. The light emitted from polarization conversion element 202 enters superposition lens 203. Superposition lens 203 is a lens for superposing lights emitted from the respective lens elements of second lens array plate 201 and illuminating liquid crystal panels 217, 218, 219 with the resultant light. First and second lens array plates 200, 201 and superposition lens 203 are used as an illumination optical system. The light from superposition lens 203 is separated into blue, green, and red light beams by blue reflecting dichroic mirror 204 and green reflecting dichroic mirror 205 which serve as color separators. The green light are transmitted through field lens 211 and incidence-side polarizing plate 214, and then incident on liquid crystal panel 217. The blue light is reflected by reflection mirror 206, and then transmitted through field lens 212 and incidence-side polarizing plate 215, and incident on liquid crystal panel 218. After being transmitted through relay lenses 209, 210 and being refracted by reflection mirrors 207, 208, the red light is transmitted through field lens 213 and incidence-side polarizing plate 216, and then incident on liquid crystal panel 219. Three liquid crystal panels 217, 218, 219 change a polarization state of the incident light by controlling a voltage applied to pixels corresponding to image signals, and modulate light in cooperation with incidence-side polarizing plates 214, 215, 216 and emission-side polarizing plates 220, 221, 222 which are arranged on both sides of liquid crystal panels 217, 218, 219 such that transmission axes are orthogonal to each other, and thus, green, blue, and red images are formed. The color light beams transmitted through emission-side polarizing plates 220, 221, 222 are reflected by the red reflecting dichroic mirror and the blue reflecting dichroic mirror, combined with the green light by color-combining prism 223, and incident on projection lens 224. The light incident on projection lens 224 is enlarged and projected on a screen (not illustrated).

Rotary diffuser plate 105 may be a dynamic diffuser plate that swings and vibrates instead of rotating.

Three liquid crystal panels using polarization are used as the image former, instead of a time-division system, and thus, it is possible to obtain a bright and high-definition projection image with excellent color reproduction without color breaking. In addition, since a total reflection prism is not necessary, a small prism having a 45 degrees incident angle can be used as the color-combining prism, the projection display apparatus can have a small size as compared with a device using three DMD elements. Second light source device 75 of the second exemplary embodiment or third light source device 87 of the third exemplary embodiment may be used as the light source device.

As described above, the first projection display apparatus of the present disclosure uses a light source device that is highly uniform and has a small size by the blue, green, and red laser light sources, the polarizing mirror, and the beam splitting element. In addition, speckle noise of light from the light source device is eliminated by the rotary diffuser plate. Thus, a highly efficient and small-size projection display apparatus can be achieved while eliminating speckle noise and luminance unevenness.

Although the transmissive liquid crystal panel is used as the image former, reflective liquid crystal panels may be used. A smaller-size and higher-definition projection display apparatus can be obtained by using the reflective liquid crystal panel.

Fifth Exemplary Embodiment

Figure 12:
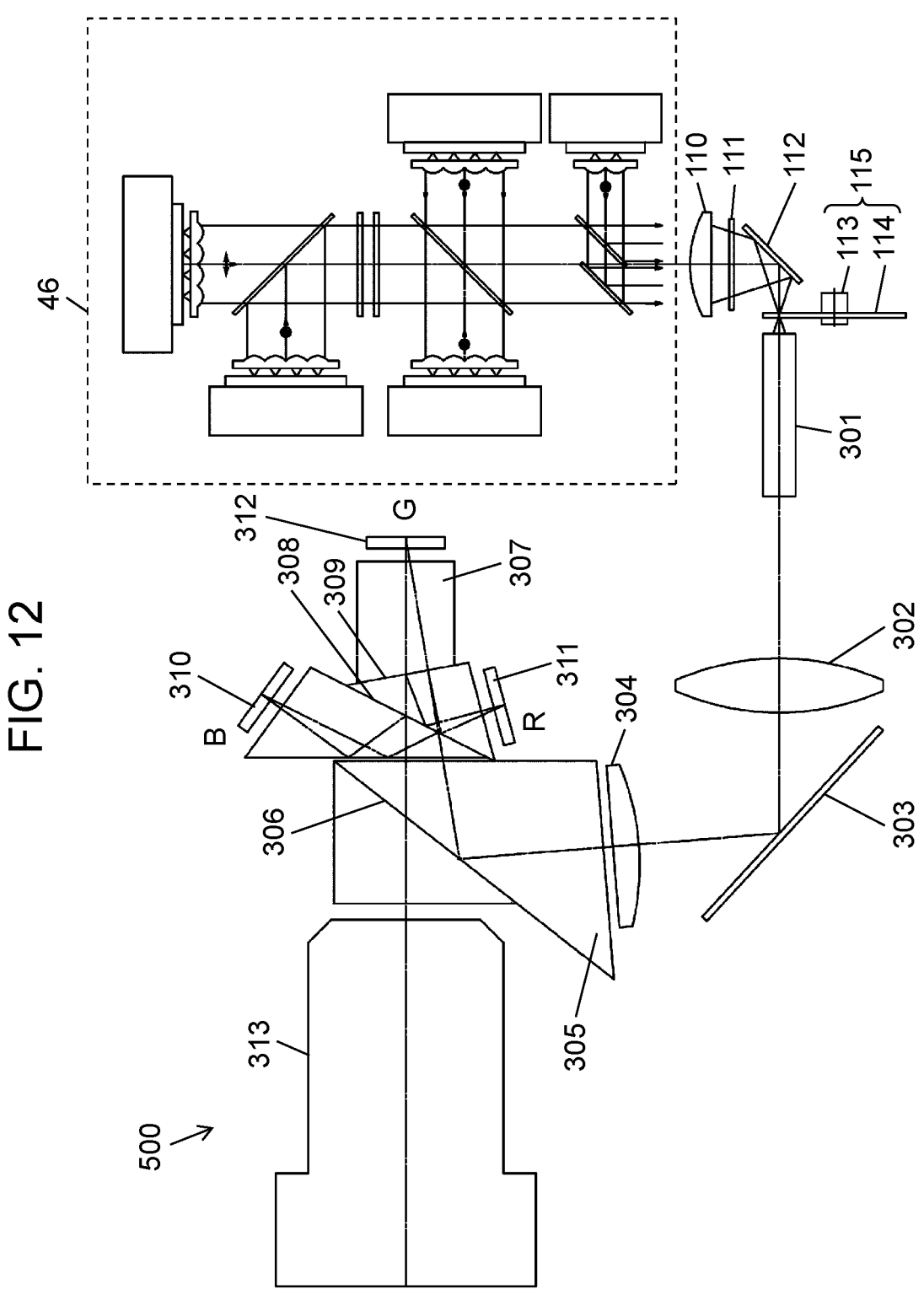
FIG. 12 is a configuration diagram of a projection display apparatus according to a fifth exemplary embodiment of the present disclosure.

FIG. 12 illustrates second projection display apparatus 500 illustrating a fifth exemplary embodiment of the present disclosure. Three DMDs are used as an image former. First light source device 46 of the first exemplary embodiment is used as the light source device.

In addition to first light source device 46, second projection display apparatus 500 further includes condenser lens 110, diffuser plate 111, reflection mirror 112, rotary diffuser plate 115 that is a dynamic diffuser plate, rod 301, relay lens 302, reflection mirror 303, field lens 304, total reflection prism 305, air layer 306, color prism 307 including three prisms in which blue reflecting dichroic mirror 308 and red reflecting dichroic mirror 309 are formed, DMDs 310, 311, 312, and projection lens 313.

Blue, green, and red laser beams emitted from first light source device 46 are transmitted through condenser lens 110, then are diffused by diffuser plate 111, are reflected by reflection mirror 112, and then are condensed on rotary diffuser plate 115. Rotary diffuser plate 115 includes circular diffuser plate 114 in which a diffusion layer is formed on one surface of a glass substrate, and motor 113 in a central portion, and the rotation of the rotary diffuser plate is controllable. A diffusion angle of rotary diffuser plate 115 is approximately 10 degrees. A random interference pattern on a screen caused by laser beam varies temporally and spatially at a high speed by rotary diffuser plate 115, by which speckle noise can be eliminated. In addition, small luminance unevenness caused by a small emission size and the number of emissions of the laser light sources can be eliminated in cooperation with diffuser plate 111. Light diffused by rotary diffuser plate 115 is incident on rod 301.

The light incident on rod 301 is reflected multiple times inside the rod, and thus, a light intensity distribution is uniformized and emitted. The light emitted from rod 301 is condensed by relay lens 302, reflected by reflection mirror 303, transmitted through field lens 304, and incident on total reflection prism 305. Total reflection prism 305 includes two prisms, and thin air layer 306 is formed between proximal surfaces of the prisms. Air layer 306 totally reflects incident light at an angle equal to or more than a critical angle. The light from field lens 304 is reflected by a total reflection surface of total reflection prism 305 and incident on color prism 307. Color prism 307 includes three prisms, and blue reflecting dichroic mirror 308 and red reflecting dichroic mirror 309 are formed on the proximal surfaces of the prisms. The light is separated into blue, red, and green light beams by blue reflecting dichroic mirror 308 and red reflecting dichroic mirror 309 of color prism 307, and are incident on DMDs 310, 311, 312. DMDs 310, 311, 312 each deflect micromirrors in accordance with video signals and reflects the light incident on projection lens 313 and the light traveling outside an effective area of projection lens 313. The light beams reflected by DMDs 310, 311, 312 are transmitted through color prism 307 again. In the course of being transmitted through color prism 307, the separated blue light, red light, and green light are combined and incident on total reflection prism 305. Since the light incident on total reflection prism 305 is incident on air layer 306 at angles less than or equal to a critical angle, the light is transmitted and incident on projection lens 313. In this manner, image light formed by DMDs 310, 311, 312 is enlarged and projected on a screen (not illustrated). Rotary diffuser plate 115 may be a dynamic diffuser plate that swings and vibrates instead of rotating.

Since DMDs are used for the image former, a projection display apparatus having higher light resistance and heat resistance as compared with the device including an image former using liquid crystal panel can be formed. Further, since three DMDs are used, a bright and high-definition projection image with good color reproduction can be obtained. Second light source device 75 of the second exemplary embodiment or third light source device 87 of the third exemplary embodiment may be used as the light source device.

As described above, the second projection display apparatus of the present disclosure uses the light source device that is highly uniform and has a small size by the blue, green, and red laser light sources, the polarizing mirror, and the beam splitting element. In addition, speckle noise of light from the light source device is eliminated by the rotary diffuser plate. Thus, a small-size and highly efficient projection display apparatus can be achieved while eliminating speckle noise and luminance unevenness.

The present disclosure relates to a projection display apparatus using an image former.

What is claimed is:

1. A light source device comprising:
a red solid-state light source configured to emit red light;
a green solid-state light source configured to emit green light;
a blue solid-state light source configured to emit blue light;
a polarizing mirror configured to combine the red light emitted from the red solid-state light source with the green light emitted from the green solid-state light source;
a beam splitting element configured to split the blue light emitted from the blue solid-state light source into transmitted blue light transmitted through the beam splitting element and reflected light reflected by the beam splitting element, and to transmit or reflect the combined red light and green light; and
dichroic mirror configured to reflect the transmitted blue light transmitted through the beam splitting element in a first direction corresponding to a reflection direction of the beam splitting element,
wherein the beam splitting element is further configured to reflect or transmit the red and green light combined by the polarizing mirror in the first direction, and
wherein the dichroic mirror is further configured to transmit the red and green light combined by the polarizing mirror in the first direction.

2. The light source device according to claim 1, wherein the polarizing mirror has characteristics of a polarizing beam splitter.

3. The light source device according to claim 1, wherein the red light emitted from the red solid-state light source, the green light emitted from the green solid-state light source, and the blue light emitted from the blue solid-state light source are linearly polarized.

4. The light source device according to claim 3, further comprising:
a phase difference plate configured to convert the red light emitted from the red solid-state light source and reflected by the polarizing mirror or the green light emitted from the green solid-state light source into circularly polarized light; and
a filter configured to invert a phase of the red light or the green light from the phase difference plate, and to reflect the light.

5. The light source device according to claim 1, wherein:
a proportion of the transmitted light and the reflected light is substantially 50%,
a transmittance when the beam splitting element transmits the combined red light and green light is more than or equal to 90%, and
a reflectance when the beam splitting element reflects the combined red light and green light is more than or equal to 90%.

6. The light source device according to claim 1, wherein the polarizing mirror is a second polarizing mirror, the light source device further comprising a first polarizing mirror configured to combine the red light emitted from the red solid-state light source or the blue light emitted from the blue solid-state light source.

7. A projection display apparatus comprising:

the light source device according to claim 1;

a dynamic diffuser plate on which combined light from the light source device is incident, the dynamic diffuser plate being configured to reduce speckle noise of the combined light;

an illumination optical system configured to condense the combined light from the dynamic diffuser plate and to illuminate an area to be illuminated;

an image forming element configured to form an image according to an image signal by using the combined light from the illumination optical system; and a projection lens configured to enlarge and project the image formed by the image forming element.

8. The projection display apparatus according to claim 7, wherein the dynamic diffuser plate includes a motor and a circular diffuser plate in which a micro irregularity shape or a lens shape is formed to a circumferential shape on a surface of a glass substrate.

9. The projection display apparatus according to claim 7, wherein the image forming element is a liquid crystal panel.

10. The projection display apparatus according to claim 7, wherein the image forming element is a mirror-deflection-type digital micromirror device (DMD).

\* \* \* \* \*